(12) United States Patent
Brashear (10) Patent No.: US 8,677,003 B1
(45) Date of Patent: Mar. 18, 2014

(54) DISTRIBUTED PROCESSING OF STREAMING DATA ON AN EVENT PROTOCOL

(75) Inventor: Ronn Brashear, San Jose, CA (US)

(73) Assignee: LiveOps, Inc., Redwood City, CA (US)

( * ) Notice: Subject to any disclaimer, the term of this patent is extended or adjusted under 35 U.S.C. 154(b) by 906 days.

(21) Appl. No.: 11/974,113

(22) Filed: Oct. 11, 2007

(51) Int. Cl.
*G06F 15/16* (2006.01)

(52) U.S. Cl.
USPC .......................................................... 709/231

(58) Field of Classification Search
USPC .......................................................... 709/231
See application file for complete search history.

(56) References Cited

U.S. PATENT DOCUMENTS

| | | | | |
|---|---|---|---|---|
| 6,115,393 | A * | 9/2000 | Engel et al. | 370/469 |
| 2001/0047293 | A1 * | 11/2001 | Waller et al. | 705/10 |
| 2004/0037267 | A1 * | 2/2004 | Bennett et al. | 370/352 |
| 2006/0067418 | A1 * | 3/2006 | Girardeau et al. | 375/265 |

OTHER PUBLICATIONS

Dean et al., ("MapReduce: Simplified Data Processing on Large Clusters"), OSDI, 2004.*
U.S. Appl. No. 10/886,333, Off. Action, Everingham et al.
U.S. Appl. No. 10/886,333, filed Jun. 5, 2008, Everingham et al.
"Evaluating MapReduce for Multi-core and Multiprocessor Systems," Ranger et al., Computer Systems Laboratory, Stanford University.
"The Phoenix System for MapReduce Programming"; http://csl.stanford.edu/~christos/sw/phoenix.
"MapReduce: Simplified Data Processing on Large Clusters," Dean et al., Google, Inc.
"Map-Reduce for Machine Learning on Multicore," Chu et al., Dept. Stanford University.
Hadoop Articles; http://wiki.apache.org/lucene-hadoop/HadoopArticles?action=print.
"Running Hadoop MapReduce on Amazon EC2 and Amazon S3," White, Amazon web services; http://developer.amazonwebservices.com/connect.
"Running Hadoop on Ubuntu Linux (Single-Node Cluster)," Noll; http://www.michael-noll.com/wiki.
"Running Hadoop on Ubuntu Linux (Multi-Node Cluster)," Noll; http://www.michael-noll.com/wiki.
"Writing an Hadoop MapReduce Program in Python," Noll; http://www.michael-noll.com/wiki.

* cited by examiner

*Primary Examiner* — William Goodchild
(74) *Attorney, Agent, or Firm* — Duane Morris LLP; David T. Xue (57) ABSTRACT

An exemplary method for distributed processing of streaming data on an event protocol comprises receiving a plurality of related events from the streaming data at a node, amending a state of the related events, determining an error margin based on the amended state, and updating a current data transformation based on the amended state and error margin, thereby enabling real time analysis of streaming data.

22 Claims, 7 Drawing Sheets

DISTRIBUTED PROCESSING OF STREAMING DATA ON AN EVENT PROTOCOL

BACKGROUND

MapReduce is a well-known programming model that enables development of scalable parallel applications to process a large amount of data on clusters of commodity computing machines. In general, through an interface with two functions, a map function and a reduce function, the MapReduce model can facilitate parallel implementation of many real-world tasks such as data processing for search engines.

A commodity machine (or a portion of a commodity machine) performing map functions may be referred to as a map node. Likewise, a commodity machine (or a portion of a commodity machine) performing reduce functions may be referred to as a reduce node. It is possible for a commodity machine to perform both map functions and reduce functions, depending on the required computations and the capacity of the machine. Typically, each map node has a one-to-one connection with a corresponding first-level reduce node. Multiple levels of reduce nodes are generally required for processing large data sets.

An initial large dataset to be processed in a MapReduce model is generally a fixed or static data set. A large fixed dataset is first divided into smaller data sets by the map nodes. The smaller data sets are then sent to first level reduce nodes for performing a reduce function on the smaller data sets. The reduce functions generate a smaller set of values which will be re-reduced at the next levels until a final result or measurement is attained. A visual representation of a MapReduce architecture may comprise nodes arranged in a funnel shape wherein an initial data set is incrementally reduced at each level until a final result exits the tip of the funnel.

It would be beneficial to provide a system capable of distributed processing of dynamic or streaming data without needing multiple levels of reduce nodes.

SUMMARY

An exemplary method for distributed processing of streaming data on an event protocol comprises receiving a plurality of related events from the streaming data at a node, amending a state of the related events, determining an error margin based on the amended state, and updating a current data transformation based on the amended state and error margin, thereby enabling real time analysis of streaming data.

Other exemplary embodiments and implementations are disclosed herein.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

I. Overview

Section II describes exemplary systems for distributed processing of streaming data.

Section III describes exemplary processes for distributed processing of streaming data.

Section IV describes exemplary implementations.

Section V describes an exemplary computing environment.

II. Exemplary Systems for Distributed Processing of Streaming Data

Figure 1:
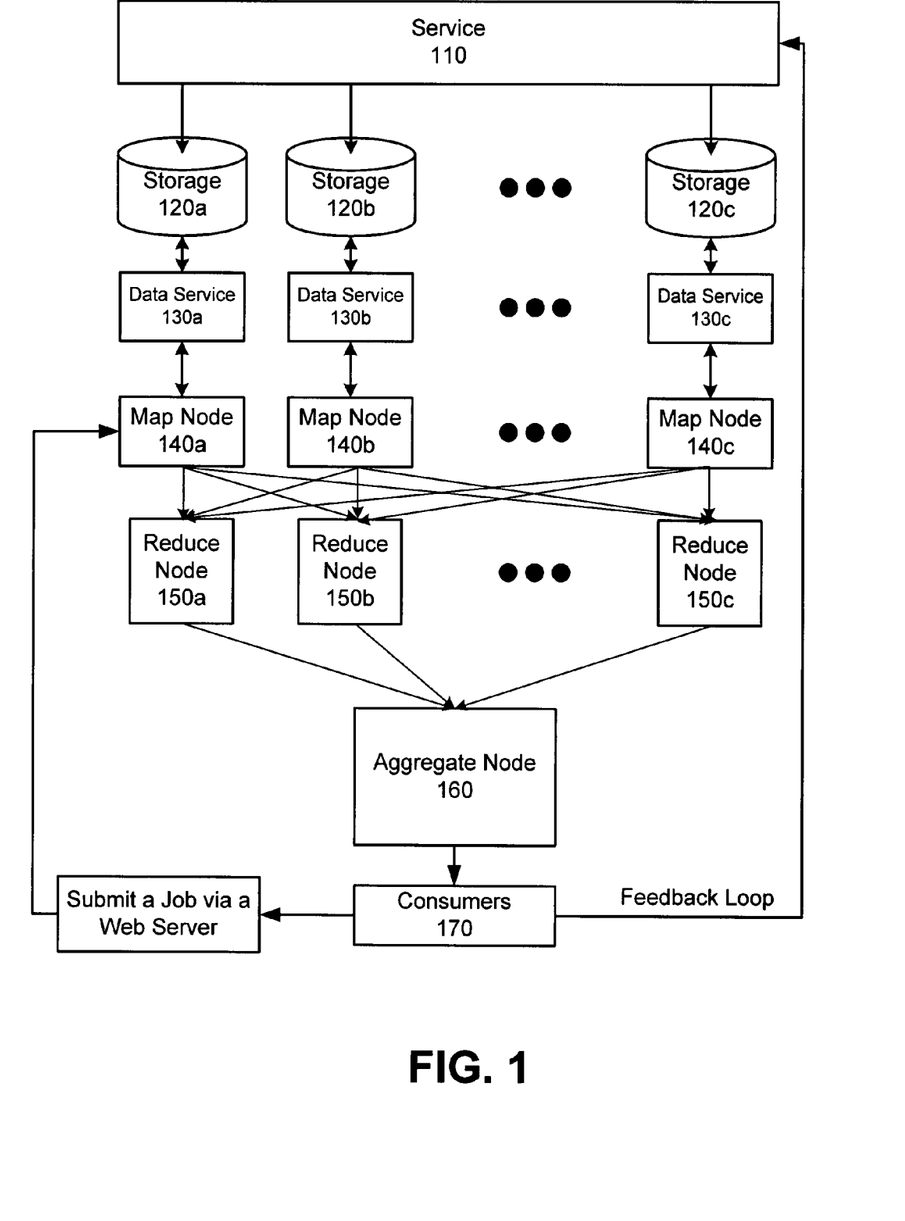
FIG. 1 illustrates an exemplary system for distributed processing of streaming data.

FIG. 1 illustrates an exemplary system 100 for distributed processing of streaming data. The exemplary system 100 includes a service 110, a plurality of storages 120a-120c, a plurality of data services 130a-130c, a plurality of map nodes 140a-140c, a plurality of reduce nodes 150a-150c, an aggregate node 160, and consumers 170. For ease of illustration and explanation, representative components are illustrated in FIG. 1. One skilled in the art will recognize that more or fewer components may be added or removed depending on specific implementations.

The service 110 may be any entity which generates or otherwise obtains data that can be processed to determine a useful result or measurement. For example, without limitation, a service may be a call center which continuously receives call related data such as customer data, operator performance data, product data, sales data, etc. Data streaming into the service 110 can be divided into events using an event protocol. Any event protocol known in the art can be implemented to process the streaming data. Exemplary event protocols include, without limitation, Java Message Service (JMS), Syslog, and Simple Mail Transfer Protocol (SMTP). In general, events are related by a key function (e.g., Key=f (Event)). Thus, events are related if they have the same key. Key calculations based on an event protocol are well known in the art and need not be described in more detail herein.

Storages 120 may be any form of storage, for example, databases, disk drives, read-only-memories, and so forth. Data services 130 are services configured to fetch data from the data storages 120. In an exemplary implementation, a data service 130 typically has a web server enabled to obtain data over a communication network (e.g., the Internet) from one or more data storages 120 depending on a particular result to be achieved.

For each execution of the data-processing algorithm, Map nodes 140 are configured to process data received from different data services as events and map the events into a format that is appropriate for the data processing and acceptable by the reduce nodes 150. In an exemplary implementation, events are mapped on a line-by-line basis into a limited number of formats. In addition, for each event received at a map node 140, the map node 140 determines a key for the event and sends related events (i.e., events having the same key) to the same reduce node 150. The map node 140 may or may not compute the key for each event.

In an exemplary implementation, the map nodes 140 are cross connected to the reduce nodes 150. That is, each map node 140 may connect to some or all reduce nodes 150 so that each map node 140 is enabled to send related events to the same reduce node 150. The map nodes 140 determine which reduce node to send each event based on the keys of the events.

For each key, a reduce node 150 applies a data transformation (e.g., a reduce function) to the related events to generate a result. The result may or may not be a final result. If the result is not final, an error margin may be calculated using any suitable error function known in the art. An interim result can be determined based on the error margin. Exemplary processes performed by a reduce node 150 are described below with reference to FIGS. 4 and 5.

The aggregate node 160 may nor may not reside in the same computing device as the other nodes (i.e., map nodes or reduce nodes). In an exemplary implementation, the aggregate node 160 is configured to collect all the data from the reduce nodes 150 (e.g., from a cache) and provide an aggregated result to a requesting consumer 170.

In an exemplary implementation, a feedback loop is provided to enable any consumer feedback to the service 110.

Figure 2:
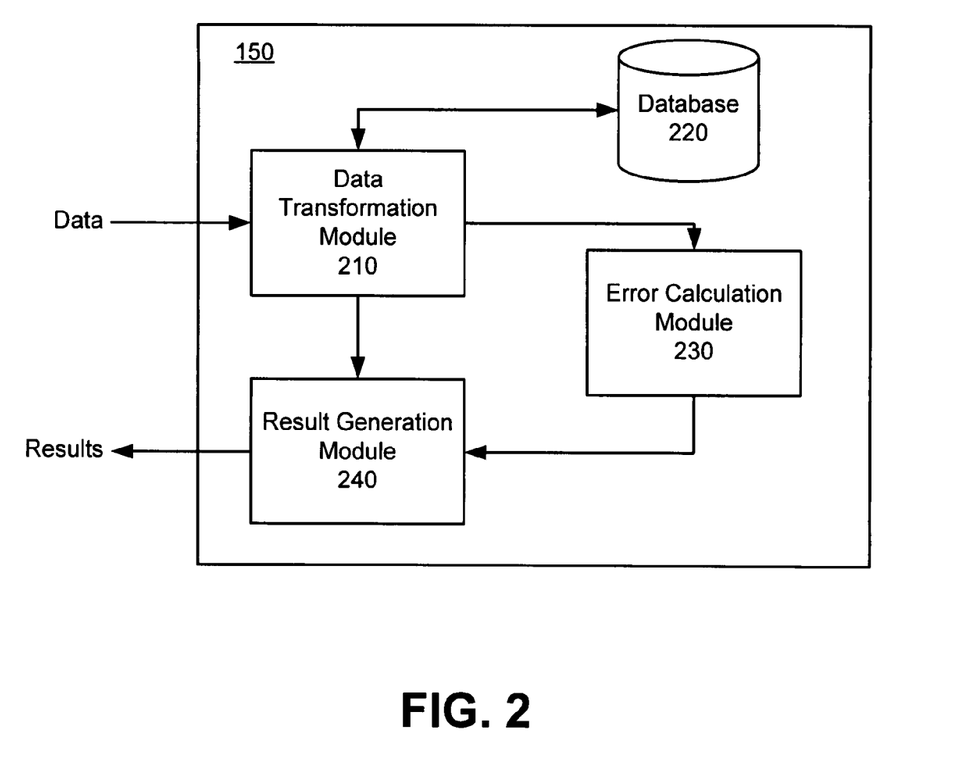
FIG. 2 illustrates an exemplary reduce node for distributed processing of streaming data.

FIG. 2 illustrates an exemplary reduce node 150. The exemplary reduce node 150 includes a data transformation module 210, a cache 220, an error calculation module 230 and a result generation module 240. Related events having the same key are received by the data transformation module 210. The data transformation module 210 fetches a current state (e.g., using the key) from the cache 220 and amends the state based on the received events, if necessary. If all the data for a given key have been received, then a final result is generated by the result generation module 240 based on an amended state associated with the key. If it is determined that more data will be received for a given key, then an error margin is calculated by the error calculation module 230. An interim result is generated by the result generation module 240 based on an amended state and an error margin associated with the key. The result, final or interim, is provided as an output from the reduce node 150.

III. Exemplary Processes for Distributed Processing of Streaming Data

Figure 3:
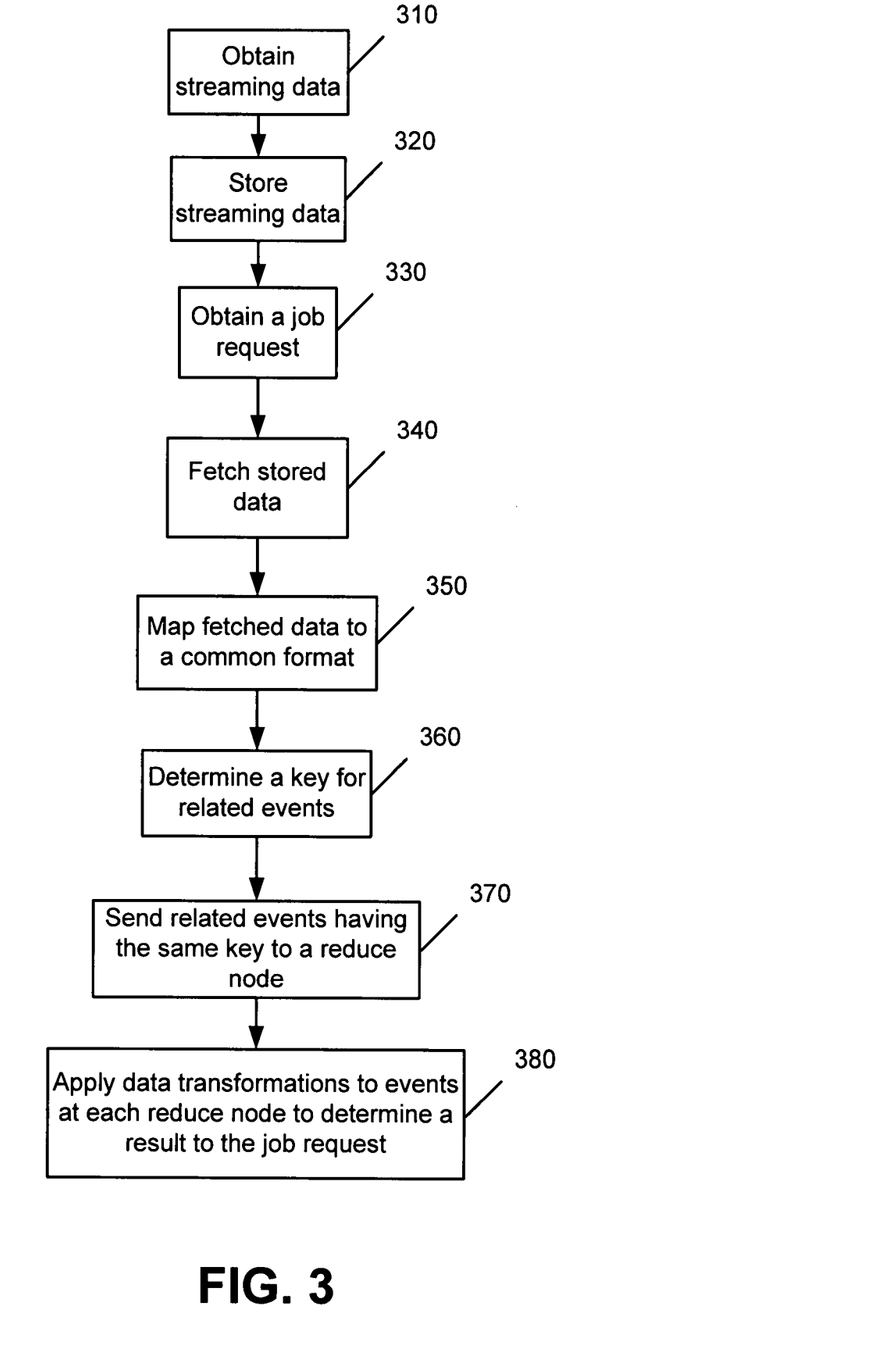
FIG. 3 illustrates an exemplary process for distributed processing of streaming data.

FIG. 3 illustrates an exemplary process for distributed processing of streaming data based on an event protocol.

At step 310, streaming data are obtained by a service 110.

At step 320, the data are stored in data storages 120.

At step 330, a job request from a consumer is received. In an exemplary implementation, any authorized entity may make a job request. The job request may be sent to one or more of the service 110, the map node 140, and/or any other components in the system 100, depending on design choice. In an exemplary implementation, a job request includes a data filter, a map task, and a reduce task. The data filter enables the map nodes 140 to obtain the particular data needed to satisfy the job request. The map task identifies the map function to be performed at the map nodes 140 to map data into a common format. The reduce task identifies the data transformation function(s) to be applied at a reduce node 150 that receives all (or substantially all) related events having the same key. The mechanics for composing a job request is well known in the art and need not be described in more detail herein.

At step 340, events are obtained from data storages 120 by data services 130 and sent to map nodes 140.

At step 350, the fetched data are divided into events in accordance with an event protocol and mapped to a common format by the map nodes 140.

At step 360, keys are determined for related events. Events are related if they have a common key. In an exemplary implementation, the map nodes 140 determine the keys based on the job request, the content of the events, and/or other information associated with the events. In another exemplary implementation, the map nodes 140 may obtain the keys from any other entity (not shown).

At step 370, related events are sent to the same reduce node 150. In general, events that are related have the same key. In an exemplary implementation, the map nodes apply a hash function (e.g., a distributed hash function or d-hash) to determine a hash value based on each key. The hash value determines which reduce node to send each event. As a result, events having the same key are routed to the same reduce node.

At step 380, data transformations are applied by the reduce nodes 150 to related events to determine a result. In an exemplary implementation, the result may be a final result. In another exemplary implementation, an interim result may be provided if additional streaming data are still to be received for a given key. One skilled in the art will recognize that the mathematical function to be applied as a data transformation depends on the nature of a job request (e.g., via problems involving cumulative transitive functions or transitive summary functions, etc.). Exemplary data transformations include, without limitation, OLAP cubes, probability distribution functions, threshold monitoring, etc.

Figure 4:
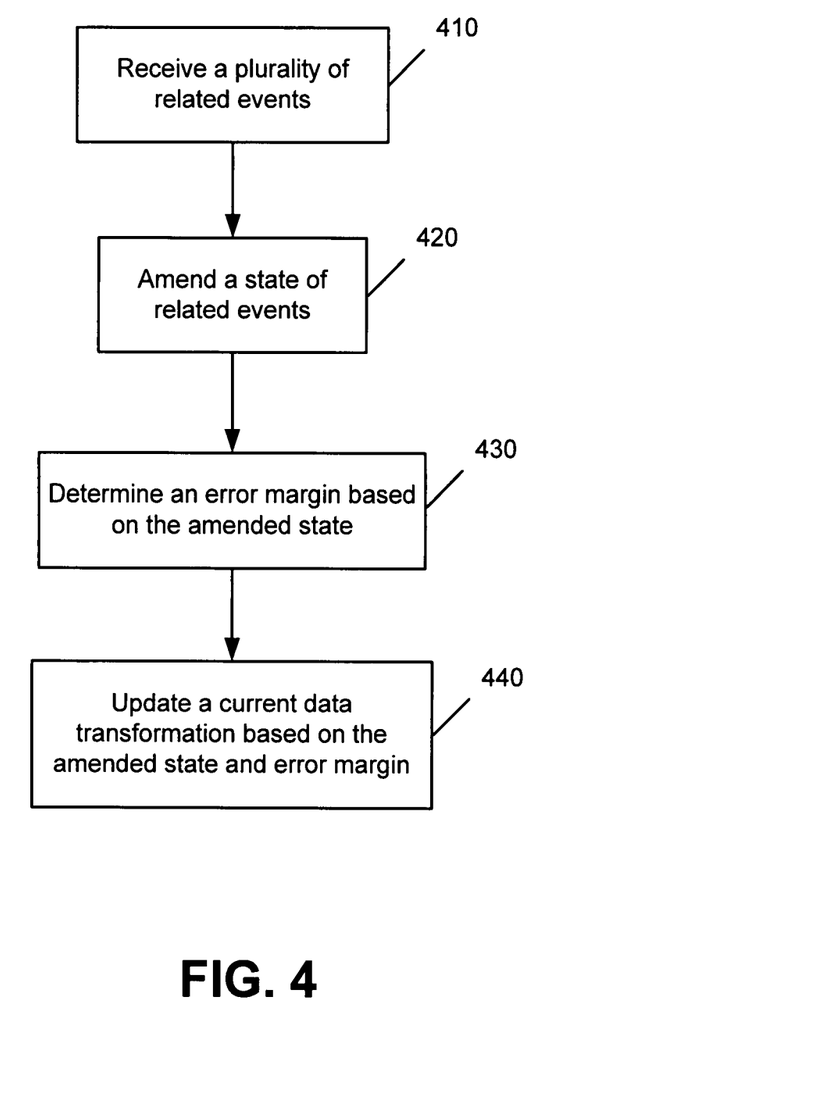
FIG. 4 illustrates an exemplary process performed by a reduce node.

FIG. 4 illustrates an exemplary process performed by a reduce node to update a current data transformation of related events sharing the same key.

At step 410, a reduce node 150 receives a plurality of related events. In an exemplary implementation, the related events are sent from one or more map nodes 140 that are cross connected to the reduce node 150.

At step 420, the reduce node 150 amends a state of the related events. In an exemplary implementation, the reduce node 150 uses the common key of the related events to fetch a current state from a local or remote cache 220. The reduce node 150 then determines, based on the content of each related event, whether to amend the current state to an amended state.

At step 430, the reduce node 150 determines an error margin based on the amended state. Any known error functions may be applied, depending design choice and/or the nature of the job request, to determine a distribution of error.

At step 440, the reduce node 150 updates a current data transformation based on the amended state and the error margin. In an exemplary implementation, the reduce node 150 determines a result, final or interim, as the new data transformation and updates the current data transformation based on the new result.

Figure 5:
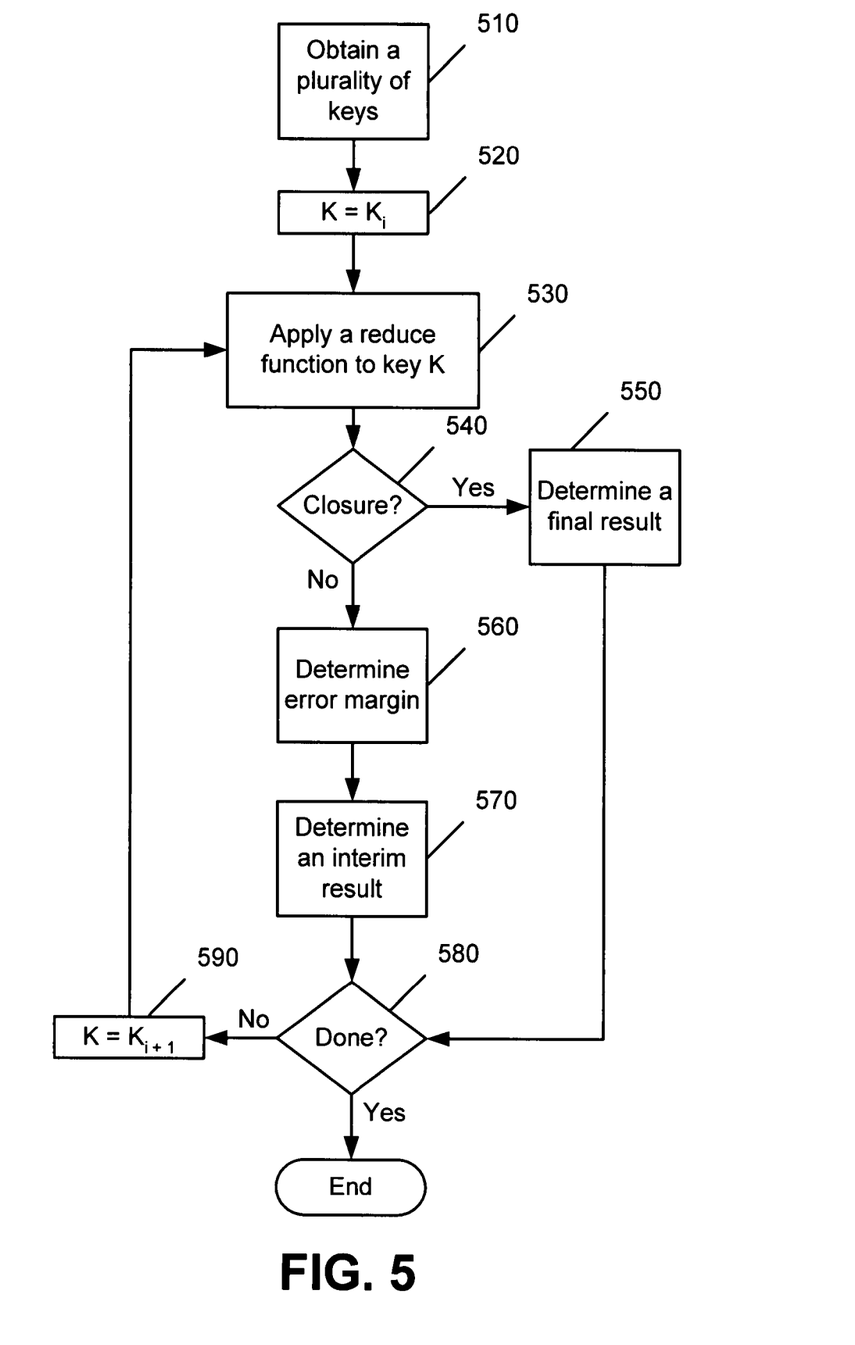
FIG. 5 illustrates an exemplary process performed by a reduce node which receives related events to multiple keys.

FIG. 5 illustrates an exemplary process performed by a reduce node receiving multiple sets of related events, wherein each set of events shares the same key.

At step 510, a plurality of keys is obtained.

At step 520, the first key, K, is set to equal to $K_i$.

At step 530, a data transformation is applied to the events having the key K. In an exemplary implementation, a data transformation is applied to determine one or more values germane to a job request. For example, the result of a data transformation may be an amended state for the key K.

At step 540, whether or not all events having the same key K have been received is determined.

If yes, at step 550, a final result is determined based on the data transformation and reduce function the process continues at step 580.

If no, at step 560, an error margin is determined based on the applied data transformation. All data transformations have known error margin functions. Exemplary error margin functions include, without limitation, weighted distance determinators and breadth first leveling.

At step 570, an interim result is determined based on the data transformation and the error margin.

At step 580, whether events for all keys have been processed is determined.

If yes, the process ends.

If not, at step 590, K is set to equal to $K_{i+1}$ and the process repeats at step 530 for all events having the key $K_{i+1}$.

IV. Exemplary Implementations

Figure 6:
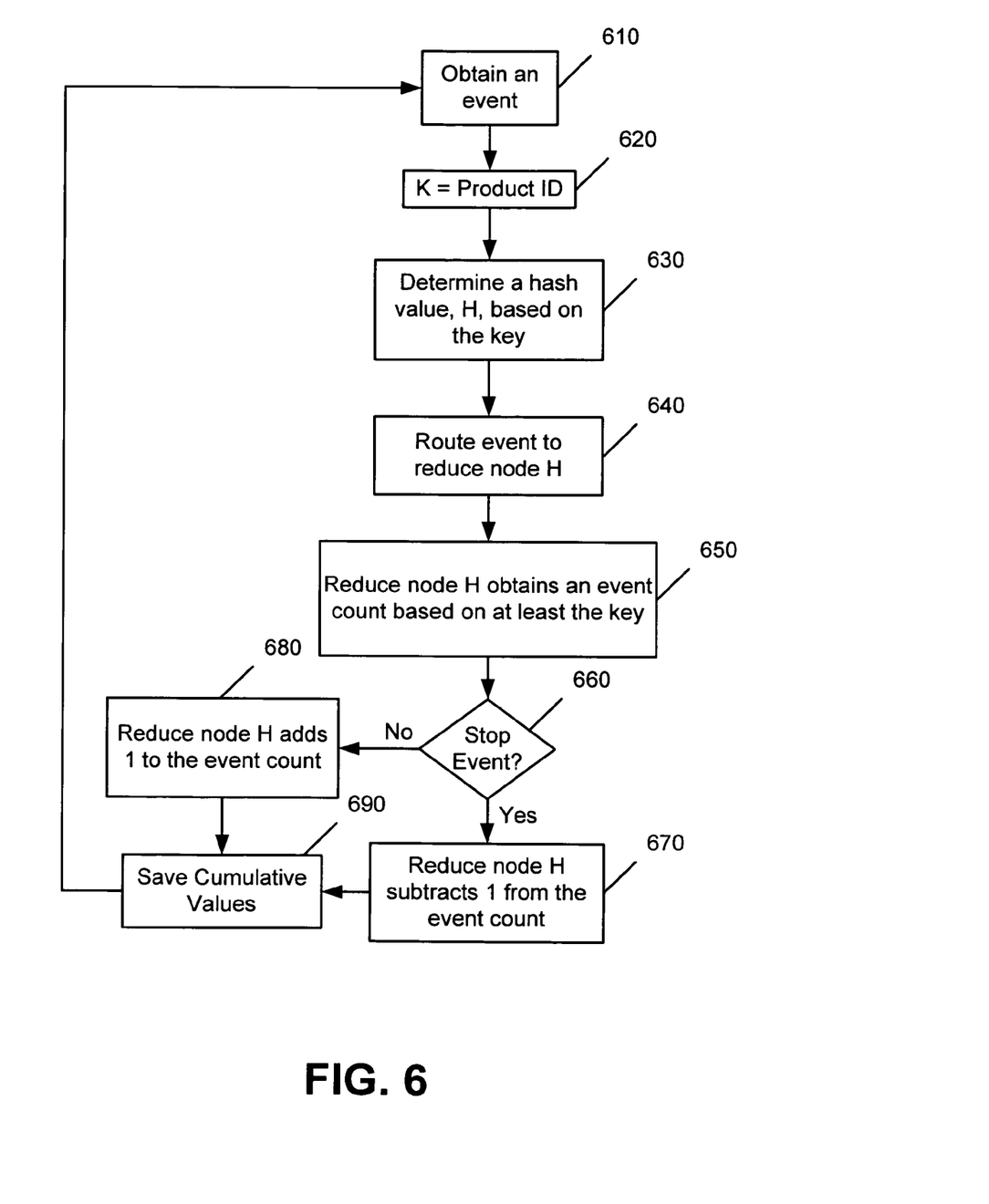
FIG. 6 illustrates an exemplary implementation.
Figure 7:
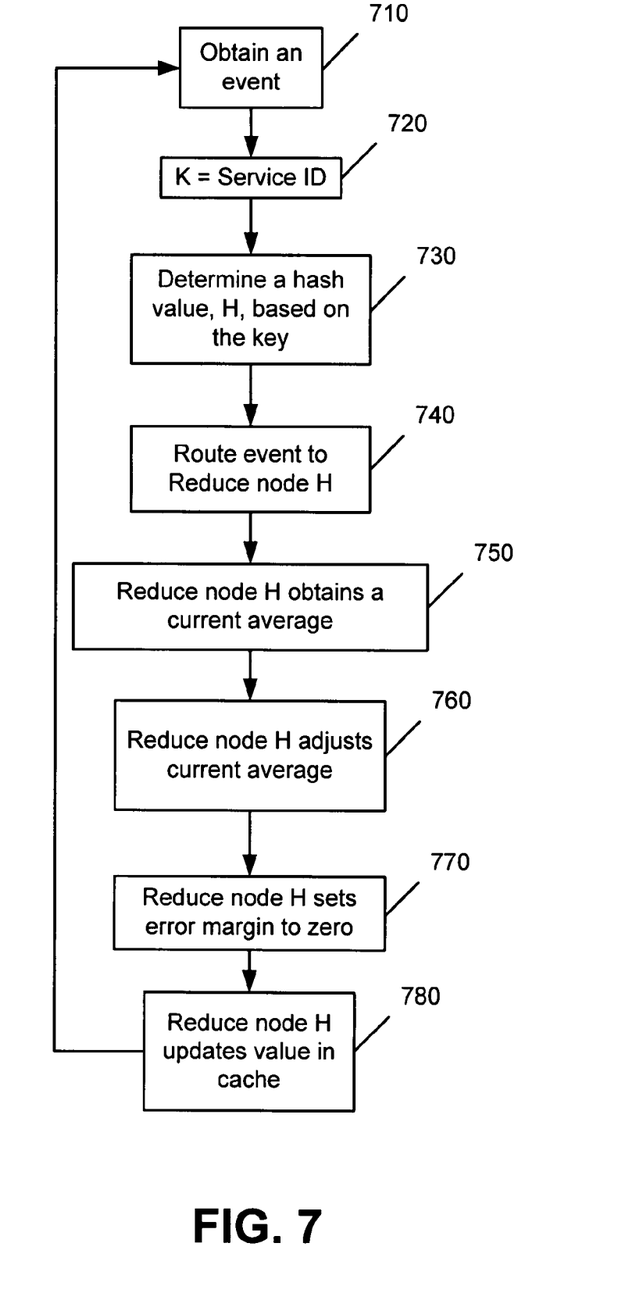
FIG. 7 illustrates another exemplary implementation.

FIGS. 6-7 illustrate exemplary implementations for distributed processing of streaming data to obtain useful results.

1. First Exemplary Implementation

FIG. 6 illustrates an exemplary process for distributed processing of streaming data for obtaining a result for a problem that does not require keeping a state of related events (e.g., problems involving cumulative transitive functions).

At step 610, an event is obtained at a map node. In an exemplary implementation, the event is fetched by the map node in response to a job request from a consumer. In this exemplary implementation, the consumer may wish to determine, for a given campaign, how many simultaneous calls are occurring at any moment. The campaign may have an associated product identifier.

At step 620, a key is determined. In an exemplary implementation, the map node may use the product identifier as the key.

At step 630, a hash value, H, is determined based on the key. Hash functions are well known in the art and need not be described in more detail herein.

At step 640, the event is routed to a reduce node identified by the hash value H (reduce node H). In an exemplary implementation, related events having the same key are routed to the same reduce node.

At step 650, based on the key of the event, the reduce node H obtains an event count from a cache.

At step 660, the reduce node H determines whether the event is a stop event (i.e., whether the call associated with the event has ended).

If yes, at step 670, the reduce node H subtracts 1 from the event count.

If no, at step 680, the reduce node H adds 1 to the event count.

At step 690, the reduce node updates an error margin and saves the cumulative count value in the cache. An error margin is calculated based on any known error function which calculates the change between complete and incomplete call sessions. In an exemplary implementation, the cache is accessible to an aggregator node which may output results to a consumer.

The process described above is merely exemplary. One skilled in the art will recognize that other results or measurements may be obtained by processing the streaming data. For example, a consumer may be able to determine the minimum, maximum and/or average counts of calls over any period of time. In this example, a reduce node may adjust a timestamp average as new events arrive.

2. Second Exemplary Implementation

FIG. 7 illustrates an exemplary process for distributed processing of streaming data for obtaining a result for a problem that requires keeping a state of related events (e.g., problems involving transitive summary functions).

At step 710, an event is obtained at a map node. In an exemplary implementation, the event is fetched by the map node in response to a job request from a consumer. In this exemplary implementation, the consumer may wish to determine, for a given service, what is the average completed call sessions over a period of time T.

At step 720, a key is determined. In an exemplary implementation, the map node may use the service name as the key.

At step 730, a hash value, H, is determined based on the key. Hash functions are well known in the art and need not be described in more detail herein.

At step 740, the event is routed to a reduce node identified by the hash value H (reduce node H). In an exemplary implementation, related events having the same key are routed to the same reduce node.

At step 750, based on the key of the event, the reduce node H obtains current average completed call sessions over time T from a cache.

At step 760, the reduce node adjusts the average and time based on the event.

In this particular example, at step 770, the error margin is set to zero because there is no uncertainty at any given time whether a call is on-going or has completed.

At step 780, the reduce node saves the average value and time in the cache. In an exemplary implementation, the cache is accessible to an aggregator node which may output results to a consumer.

The process described above is merely exemplary. One skilled in the art will recognize that other results or measurements may be obtained by processing the streaming data.

3. Other Exemplary Implementations

The exemplary implementations described above are merely illustrative. One skilled in the art will recognize that other applications may be implemented to generate results based on distributed processing of streaming data. For example, in a call center service scenario, the system can be used to solve problems relating to monitoring, real time billing, real time analysis, dynamic service, real time quality assurance, dynamic load balancing, script comparison, performance analysis, and/or other problems that involve data processing.

Of course, the invention is not limited to call center services. It may be implemented in any service wherein real time analysis is useful for supporting operations and/or business objectives. For example, the system may be implemented to compute entire body systemic changes during an on-going surgery, detect heat changes by faults to predict earthquakes, determine stock trending, and/or other implementations.

V. Exemplary Operating Environments

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method for distributed processing of streaming call center data on an event protocol, comprising:
   (a) receiving a plurality of related events from said streaming call center data at a node, said streaming call center data including data being dynamically collected during on-going phone calls while the data are being processed;
   (b) amending a state of said related events based on a common key function of the related events;
   (c) determining an error margin based on the amended state, said error margin representing an uncertainty in the streaming data as a result of a portion of said data being from on-going phone calls; and
   (d) updating a current data transformation based on the amended state and error margin, thereby enabling real time analysis of streaming data.

2. The method of claim 1, wherein said events are related by a key function.

3. The method of claim 2, wherein said node is determined based on said key function.

4. The method of claim 1, wherein said amending is based on a current state associated with said related events.

5. The method of claim 1, wherein said updating includes modifying a prior measurement.

6. The method of claim 1, wherein said updating includes modifying an interim result.

7. The method of claim 1, wherein said updating includes:
   (i) examining current states of a plurality of related events;
   (ii) aggregating said current states; and
   (iii) adjusting said aggregate with said error margin.

8. A server configured for distributed processing of streaming call center data on an event protocol, comprising:
   a processor; and
   a computer memory coupled to the processor, the computer memory including:
   a data transformation module configured to receive a plurality of related events from said streaming call center data at a node and amend a state of said related events based on a common key function of the related events, said streaming call center data including data being dynamically collected during on-going phone calls while the data are being processed;
   an error calculation module configured to determine an error margin based on the amended state, said error margin representing an uncertainty in the streaming data as a result of a portion of said data being from on-going phone calls; and
   a result generation module configured to update a current data transformation based on the amended state and error margin, thereby enabling real time analysis of streaming data.

9. The server of claim 8, wherein said events are related by a key function.

10. The server of claim 9, wherein said node is determined based on said key function.

11. The server of claim 8, wherein said amending is based on a current state associated with said related events.

12. A non-transitory computer-readable medium for distributed processing of streaming call center data on an event protocol, comprising logic instructions that, if executed:
   (a) receive a plurality of related events from said streaming call center data at a node, said streaming call center data including data being dynamically collected during on-going phone calls while the data are being processed;
   (b) amend a state of said related events based on a common key function of the related events;
   (c) determine an error margin based on the amended state, said error margin representing an uncertainty in the streaming data as a result of a portion of said data being from on-going phone calls; and
   (d) update a current data transformation based on the amended state and error margin, thereby enabling real time analysis of streaming data.

13. The computer-readable medium of claim 12, wherein said events are related by a key function.

14. The computer-readable medium of claim 13, wherein said node is determined based on said key function.

15. A method for distributed processing of streaming call center data on an event protocol, comprising:
   (a) receiving a plurality of events from said streaming call center data at a first node, said streaming call center data including data being dynamically collected during on-going phone calls while the data are being processed;
   (b) determining a second node for processing a set of related events; and
   (c) sending said set of related events to said second node; said second node being configured to:
   (1) amend a state of said related events based on a common key function of the related events;
   (2) determine an error margin based on the amended state, said error margin representing an uncertainty in the streaming data as a result of a portion of said data being from on-going phone calls; and
   (3) update a current data transformation based on the amended state and error margin, thereby enabling real time analysis of streaming data.

16. The method of claim 15, wherein said events are related by a key function.

17. The method of claim 16, wherein said second node is determined based on said key function.

18. The method of claim 15, wherein said amending is based on a current state associated with said related events.

19. The method of claim 15, wherein said updating includes modifying a prior measurement.

20. A system for distributed processing of streaming call center data on an event protocol, comprising:
   a plurality of map nodes implemented in one or more computing devices for obtaining streaming call center data from a service, said streaming call center data including data being dynamically collected during on-going phone calls while the data are being processed;
   a plurality of reduce nodes implemented in one or more computing devices and cross connected to said map nodes; each of said reduce nodes including:

(1) a data transformation module configured to receive a plurality of related events from said streaming data at a node and amend a state of said related events based on a common key function of the related events;
(2) an error calculation module configured to determine an error margin based on the amended state, said error margin representing an uncertainty in the streaming data as a result of a portion of said data being from on-going phone calls; and
(3) a result generation module configured to update a current data transformation based on the amended state and error margin, thereby enabling real time analysis of streaming data.

21. The system of claim 20, wherein said events are related by a key function.

22. The system of claim 21, wherein said second node is determined based on said key function.

* * * * *